Aug. 3, 1926.

A. T. BALDWIN

DRY BATTERY

Filed May 22, 1923  2 Sheets-Sheet 1

1,594,486

INVENTOR
ALLEN T. BALDWIN
BY
ATTORNEYS

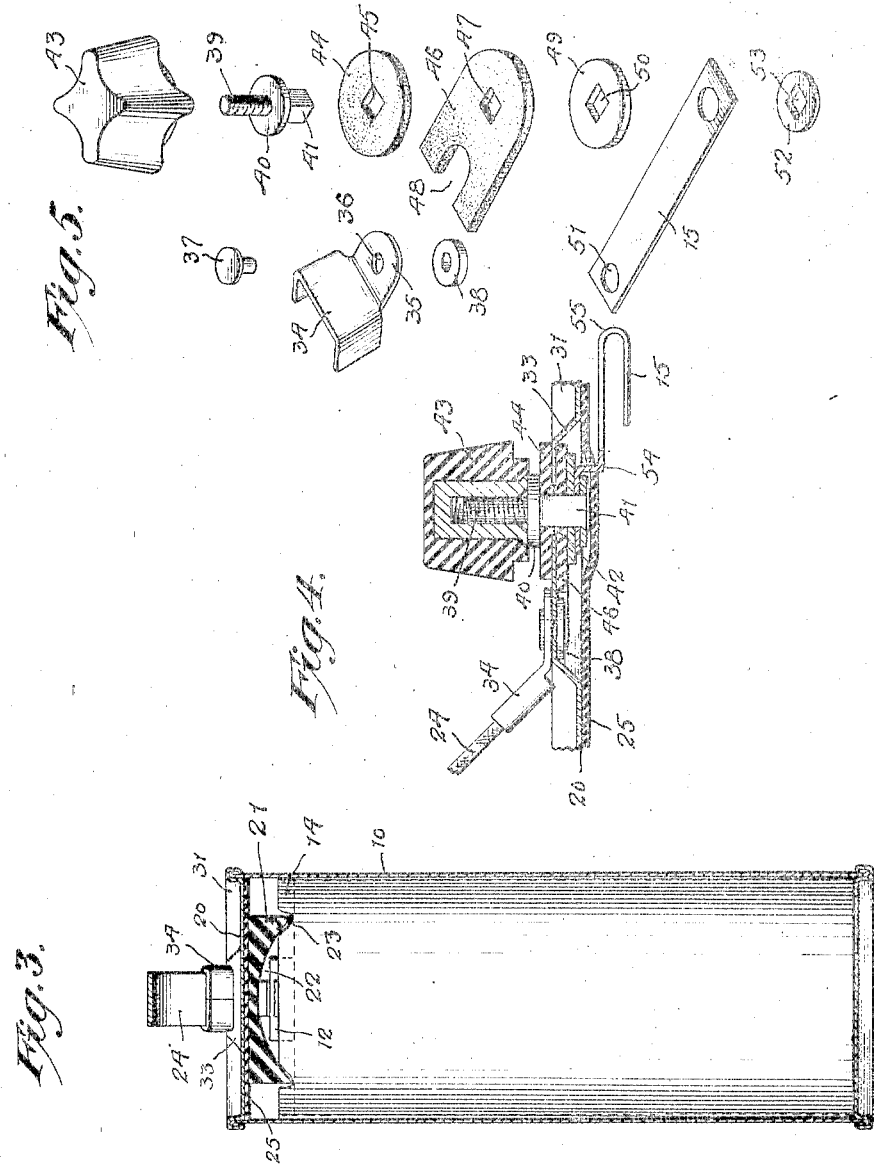

Patented Aug. 3, 1926.

1,594,486

UNITED STATES PATENT OFFICE.

ALLEN T. BALDWIN, OF MONTCLAIR, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed May 22, 1923. Serial No. 640,721.

My invention relates to dry batteries, and particularly to a multi-cell battery unit. The object of my invention is to provide a simple and efficient construction designed for economical manufacture, durability in service and electrical efficiency, obviating many of the dangers of injury incident to the rough handling and other service conditions to which a structure of this general character is commonly subjected.

In the accompanying drawings—

Fig. 3 is a section on the line 3—3, Fig. 1;

Fig. 4 is a section on the line 4—4, Fig. 1; and

Fig. 5 is a dropped perspective of the elements attached to one of the cover bosses.

Figures 1, 2:
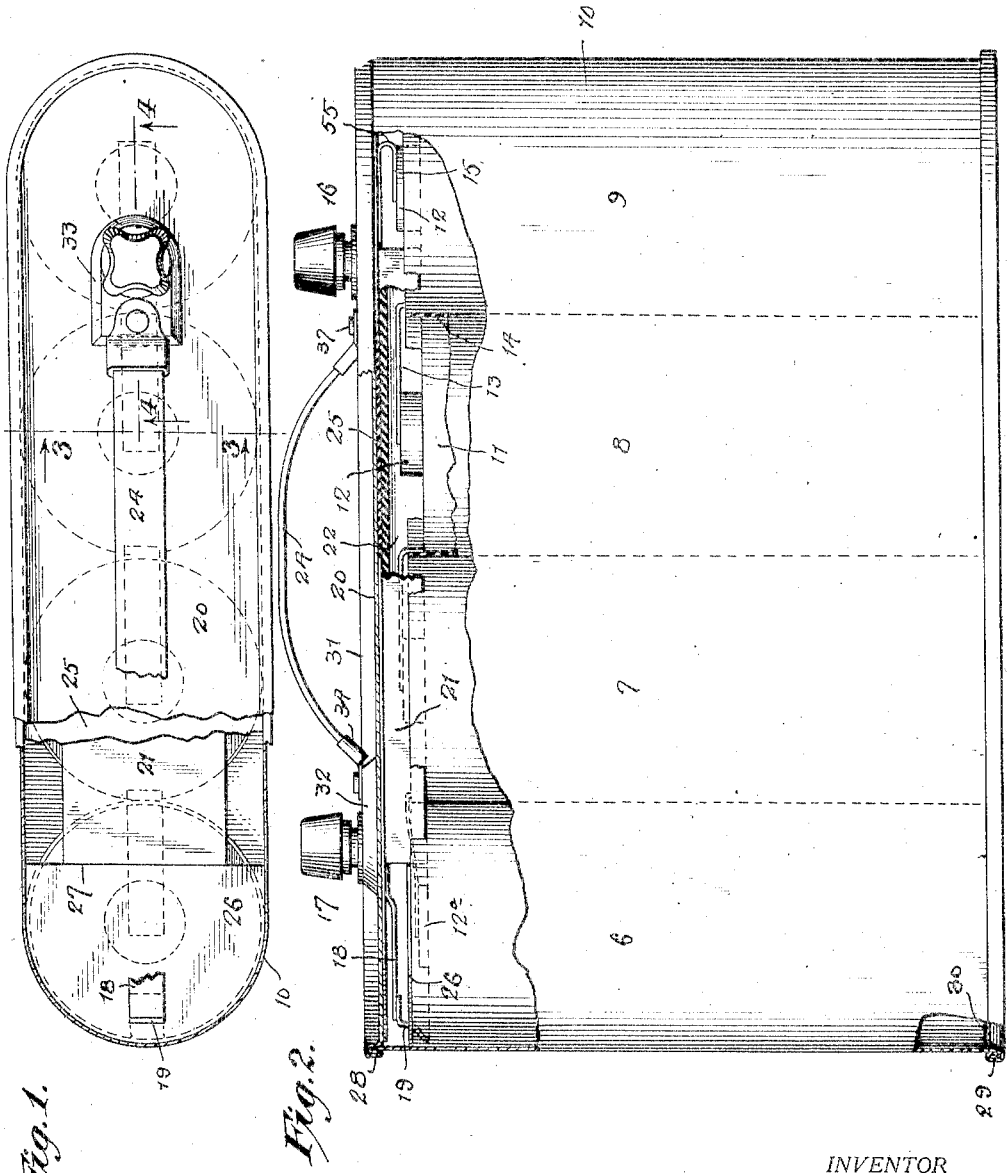
Fig. 1 is a broken plan view of a multi-cell unit in which my invention is embodied in one form.
Fig. 2 is a broken side elevation thereof.

As here shown the unit comprises a group of four cells 6, 7, 8 and 9 arranged within the body element 10 of an enclosing sheet metal casing or can appropriately shaped to closely fit the battery group. Each of the battery cells comprises the usual metal cylinder 11, commonly of zinc, forming one pole of the cell, and a central carbon rod 12 forming the other pole of the cell. The cells are connected in series by straps 13, one end of which may be soldered or otherwise secured to the shell of one cell, and the other end to the head of the carbon rod 12 of the adjacent cell. Each cell is surrounded by an insulating jacket 14 of paper, or the like, which rises above the zinc shell 11, and over the edge of which the strap 13 passes, and by which the latter is spaced from the shell element.

The carbon pole 12 of the cell at one end of the series has soldered or otherwise secured thereto a connector 15, having a hinge bend and engaged at one end with one of the exposed binding posts 16 mounted on the cover of the casing; while the other binding post 17 is connected by the straight strap 18 to the lug 19 projecting from the shell of the cell at the opposite end of the series.

To accommodate the up-standing carbon posts 12 and the several straps 13, connectors 15 and 18, and lug 19, the tops of the cells are spaced from the cover 20 of the casing. In order to hold the several cells rigidly in position, and thus to prevent injury to the electrical connections, which might result if the cells were loosely arranged in the casing, a spacer block 21 of relatively rigid insulating material, is interposed between the cover 20 and the cells, and is firmly pressed upon the latter when the cover is secured upon the casing body 10. This spacer block is preferably of wood and is of a length sufficient to overlie, at least partially, all the cells of the group. It is also recessed on its lower face, as for instance by an arch channel 22, to span and clear the heads of the carbon posts 12 and the connecting straps 13. The longitudinal side margins of the block adjacent the cells preferably present rather sharp edges 23 which, under the pressure of the cover 20 when the latter is secured in position, crush through the projecting margins of the cell jackets 14 and rest upon the shells 11 or body portions of the several cells. The block 21 thus forms a rigid spacer between the cover 20 and the cells and firmly maintains the latter in precise position within the casing, and prevents any displacement thereof during shipment or handling of the battery unit.

The cover 20 of the unit has assembled thereon, prior to its attachment on the body of the casing 10, the binding terminals 16 and 17 and the carrying handle 24. It is interiorly lined by a sheet 25 of insulation, through slits in which the terminal connectors 15 and 18 project in opposite directions, and by which the lining is thus retained in position.

To assemble the cover on the casing, the end of the bent strap 15 extending to the center contact 12 of the end cell 9 is first secured to the head of the post 12, while the cover is in raised position at one end of the unit. The cover is then swung downward, and the end of the straight strap 18, previously flexed somewhat away from the cover, is soldered to the lug 19 extending upward from the shell of the opposite end cell 6. In order the better to accommodate the strap 18, the head of the center post 12ª thereof is depressed below the level of the other center posts, and it, together with portion of its associated strap 13, is overlaid by a fiber plate of insulation 26, which prevents short circuiting. The sheet 26 is slotted to permit the lug 19 to pass therethrough, the latter thus serving as means for retaining the plate in proper position. The inner side of the plate is preferably squared at 27 and forms a locating abutment for one end of the spacer block 21 which is thus readily positioned properly with respect to the several cells.

After the straps 15 and 18 have been connected, the cover is pressed firmly down upon the spacer block (previously placed in position), and the cover margin 28 rolled over the out-turned margin of the casing 10 and pressed against the side of the latter to form a practically water-tight seal. A similar joint 29 is formed between the bottom 30 and the body 10 of the casing, so that the casing affords an effective water-tight closure for the cells.

To properly locate the cover 20 with respect to the casing wall, and to facilitate the formation of its marginal seal, the cover is preferably cupped. In view of the fact that moisture is apt to gather within the cupped cover and penetrate to the interior of the battery unit through the apertures necessary for the passage of the binding terminals 16 and 17 therethrough, and also for the rivets by which the handle 24 is secured to the cover, the latter, at the points at which it is apertured, is raised at least to the level of the side flanges 31. As here shown, the pierced areas are in the form of independent bosses 32 and 33, the tops of which lie substantially in the plane of the top of the side flanges 31 of the cover. Obviously they may be raised slightly above this level if desired, but I have found that all necessary practical protection is afforded by arranging the tops of the bosses in the plane of the top margins of the side flanges 31. It seldom happens that the battery lies in an exactly horizontal position, and standing water constantly overflows the flange 31 before it rises above the top of the bosses 32 and 33. Moreover, when the cover is forced down upon the spacing block 21 a slight outward bowing (not shown) of the cover may result which raises the tops of the bosses 32 and 33 slightly above the level of the cover margin.

As shown in Fig. 4, the handle 24, preferably of flexible material, such as fabric, is secured at its opposite ends to clips 34, each of which is provided with a base 35 pierced at 36 to receive a rivet 37 which passes therethrough and through a corresponding hole in the top of one of the bosses, and is spread beneath a washer 38 arranged around the stem of the rivet on the other face of the boss.

Each binding terminal comprises a post having a threaded outer end 39, an abutment flange 40, and a rectangular shank 41, the latter passing through a large hole 42 in the boss and spaced from the margins thereof. Threaded on the outer end 39 of the terminal is a thumb nut 43 for clamping a wire or connector. Interposed between the flange 40 of the post and the upper surface of the boss is an insulating washer 44 pierced at 45 to permit the stem 41 of the post to pass therethrough. Below the surface of the boss is a second insulating washer 46, pierced by an aperture 47 shaped to the contour of the stem 41 of the post which passes therethrough and is held thereby against rotation. The washer is accurately shaped to the inner contour of the boss and is also provided with an extended area notched at 48 to straddle and closely engage the washer 38 over which the end of the rivet 37 is spread. The close engagement of the margin of the washer 46 with the sides of the boss, and its engagement with the washer 38, hold the washer 46 rigidly in position, and by reason of the non-circular contour of the aperture 47 therein, through which the non-circular stem 41 passes, the post is held against rotation incident to the torsional strains applied thereto by the thumb nut 43. The washer 46 also serves to accurately position the post with respect to the aperture 42 in the boss through which it passes, and from the margins of which it is accurately held in spaced relation. Below the insulating washer 46 is arranged a metal washer 49 pierced at 50 to accommodate the stem of the binding post, which passes therethrough, and through the hole 51 in the connecting strap 15, beneath which is arranged another metal washer 52 apertured at 53 to accommodate the stem 41 of the binding post and over which the projecting end of the stem is spread to rivet the parts in assembled condition. The riveting operation is performed under such pressure that the portions of the insulating washers 44 and 46, which face the aperture 42 in the boss, are forced into the latter and in effect form an insulating bushing lining the aperture and effectively spacing the binding post from the margins thereof.

It will be noted that the connecting strip 15 passes through a slot in the lining sheet 25 of insulation and offset at 54 below the latter, thus supporting the sheet against the inner face of the cover plate and effectively insulating the latter from possible accidental contact with any of the conductors within the casing. The hinge bend of the strap is indicated at 55 and, as above stated, facilitates its connection with the center post head 12 of the cell 9 during the assembly of the cover.

The construction illustrated provides a multi-cell unit having many advantages over the structures heretofore available in (1) that the several cells of the unit are firmly secured in position by the arched insulating block 21 interposed between same and the cover, so that all danger of possible injury to the connections between the various cells incident to acidental displacement of the cells with relation to each other is completely avoided; (2) that all danger of possible short circuit of the terminal cell 6 by the contact strip 18 is prevented by the insulating plate 26; (3) that all perforations of the cover through which leakage might occur are raised above the level of standing water in the cover; (4) that the terminal posts are more perfectly insulated from the cover and secured against rotary displacement; (5) that all of the parts are readily manufactured and assembled.

The construction described is merely illustrative of my invention, which is subject to various modified embodiments obvious to those skilled in the art, which do not depart from the scope of what I claim as my invention.

I claim as my invention—

1. In a multi-cell battery unit, a sheet metal casing having within it cells unprotected against moisture, a cupped cover for said casing, handle and binding terminal elements piercing said cover within the area defined by the raised side margins of the cup, said cover being offset in the areas pierced by the said elements to raise said pierced areas above the body level of the cover.

2. In a multi-cell battery unit, a sheet metal casing having within it cells unprotected against moisture, a cupped cover for said casing, bosses rising from the body of the cover to at least the level of the side margins thereof, and handle and binding terminal elements piercing the raised areas of said bosses, the body of the cup-shaped cover being imperforate.

3. In a multi-cell battery unit, a sheet metal casing and a cover therefor, a series of battery cells arranged side by side in line within the casing, a terminal lug projecting from the cell at one end of the series, an insulating plate pierced by said lug and held in position thereby, in combination with a spacer block abutting at one end against said plate and interposed between said cover and cells to maintain the latter firmly against displacement.

4. A multi-cell battery comprising a casing, a series of battery cells arranged therein, a casing cover, an insulating lining of sheet material slotted at appropriate points, binding terminals carried by the cover and connector straps engaging said terminals and extending in opposite directions through the slots in the lining sheet to hold the latter in position with respect to the cover.

5. A multi-cell battery comprising an elongated casing, a series of battery cells arranged therein, an elongated cover for the casing, an insulating lining of sheet material for said cover slotted at appropriate points, binding terminals carried by the cover toward its opposite ends, and connection straps engaging said terminals and extending in opposite directions, lengthwise of the cover, through the slots in the lining sheet to hold the latter in position with respect to the cover.

6. A multi-cell battery comprising an elongated casing, a series of battery cells arranged therein, an elongated cover for the casing, an insulating lining of sheet material for said cover slotted at appropriate points, binding terminals carried by the cover toward its opposite ends, and connection straps engaging said terminals and extending in opposite directions, lengthwise of the cover, through the slots in the lining sheet to hold the latter in position with respect to the cover, one of said straps having a return bend therein to facilitate its engagement with the center contact of the cell at one end of the series.

In testimony whereof I have signed my name to this specification.

ALLEN T. BALDWIN.